United States Patent
Yavorsky

(10) Patent No.: US 12,447,269 B2
(45) Date of Patent: Oct. 21, 2025

(54) TORSIONAL INSERTION DEVICES

(71) Applicant: MEDTRONIC MINIMED, INC., Northridge, CA (US)

(72) Inventor: Matthew William Yavorsky, Granada Hills, CA (US)

(73) Assignee: Medtronic Minimed, Inc., Northridge, CA (US)

( * ) Notice: Subject to any disclaimer, the term of this patent is extended or adjusted under 35 U.S.C. 154(b) by 880 days.

(21) Appl. No.: 17/496,038

(22) Filed: Oct. 7, 2021

(65) Prior Publication Data

US 2022/0143302 A1  May 12, 2022

Related U.S. Application Data

(60) Provisional application No. 63/112,582, filed on Nov. 11, 2020.

(51) Int. Cl.
*A61M 5/142* (2006.01)
*A61M 5/145* (2006.01)
*A61M 5/158* (2006.01)

(52) U.S. Cl.
CPC ...... *A61M 5/14248* (2013.01); *A61M 5/1454* (2013.01); *A61M 5/158* (2013.01); *A61M 2005/14252* (2013.01)

(58) Field of Classification Search
CPC ............ A61M 5/1454; A61M 5/14248; A61M 5/158; A61M 2005/14252; A61M 5/3287; A61M 2005/1585; A61M 5/1452
See application file for complete search history.

(56) References Cited

U.S. PATENT DOCUMENTS

| | | | |
|---|---|---|---|
| 4,755,173 A | 7/1988 | Konopka et al. |
| 5,391,250 A | 2/1995 | Cheney, II et al. |
| 5,485,408 A | 1/1996 | Blomquist |
| 5,522,803 A | 6/1996 | Teissen-Simony |
| 5,665,065 A | 9/1997 | Colman et al. |
| 5,800,420 A | 9/1998 | Gross et al. |
| 5,807,375 A | 9/1998 | Gross et al. |
| 5,925,021 A | 7/1999 | Castellano et al. |

(Continued)

FOREIGN PATENT DOCUMENTS

| | | |
|---|---|---|
| WO | 2015164645 A1 | 10/2015 |
| WO | 2018165499 A1 | 9/2018 |
| WO | 2022103869 A1 | 5/2022 |

OTHER PUBLICATIONS

Screen capture from Bilibili video clip entitled "Link Sliding Slot Mechanism_9 (Slotted Sine Generator)," 1 pg, uploaded on Mar. 18, 2020. Retrieved from Internet on Jul. 11, 2025: <https://www.bilibili.com/video/av96805325/>.

*Primary Examiner* — James D Ponton
(74) *Attorney, Agent, or Firm* — Fortem IP LLP

(57) ABSTRACT

This disclosure relates to a detachable insertion mechanism that includes a torsion spring configured to impart rotational motion to a rotatable assembly and rotate the rotatable assembly between a first position and a second position in response to the rotational motion and a piston mechanism connected to a distal portion of the torsion spring and configured to move from a first insertion position to a second insertion position in response to the motion of the rotatable assembly. The piston mechanism includes a captive introducer needle disposed thereon. The captive introducer needle is configured to pierce tissue.

19 Claims, 9 Drawing Sheets

(56) References Cited

U.S. PATENT DOCUMENTS

| | | |
|---|---|---|
| 5,954,643 A | 9/1999 | Antwerp et al. |
| 6,017,328 A | 1/2000 | Fischell et al. |
| 6,186,982 B1 | 2/2001 | Gross et al. |
| 6,246,992 B1 | 6/2001 | Brown |
| 6,248,067 B1 | 6/2001 | Causey, III et al. |
| 6,248,093 B1 | 6/2001 | Moberg |
| 6,355,021 B1 | 3/2002 | Nielsen et al. |
| 6,379,301 B1 | 4/2002 | Worthington et al. |
| 6,544,212 B2 | 4/2003 | Galley et al. |
| 6,558,351 B1 | 5/2003 | Steil et al. |
| 6,591,876 B2 | 7/2003 | Safabash |
| 6,641,533 B2 | 11/2003 | Causey, III et al. |
| 6,736,797 B1 | 5/2004 | Larsen et al. |
| 6,749,587 B2 | 6/2004 | Flaherty |
| 6,766,183 B2 | 7/2004 | Walsh et al. |
| 6,801,420 B2 | 10/2004 | Talbot et al. |
| 6,804,544 B2 | 10/2004 | Van Antwerp et al. |
| 7,003,336 B2 | 2/2006 | Holker et al. |
| 7,029,444 B2 | 4/2006 | Shin et al. |
| 7,066,909 B1 | 6/2006 | Peter et al. |
| 7,137,964 B2 | 11/2006 | Flaherty |
| 7,303,549 B2 | 12/2007 | Flaherty et al. |
| 7,399,277 B2 | 7/2008 | Saidara et al. |
| 7,442,186 B2 | 10/2008 | Blomquist |
| 7,602,310 B2 | 10/2009 | Mann et al. |
| 7,647,237 B2 | 1/2010 | Malave et al. |
| 7,699,807 B2 | 4/2010 | Faust et al. |
| 7,727,148 B2 | 6/2010 | Talbot et al. |
| 7,785,313 B2 | 8/2010 | Mastrototaro |
| 7,806,886 B2 | 10/2010 | Kanderian, Jr. et al. |
| 7,819,843 B2 | 10/2010 | Mann et al. |
| 7,828,764 B2 | 11/2010 | Moberg et al. |
| 7,879,010 B2 | 2/2011 | Nunn et al. |
| 7,890,295 B2 | 2/2011 | Shin et al. |
| 7,892,206 B2 | 2/2011 | Moberg et al. |
| 7,892,748 B2 | 2/2011 | Norrild et al. |
| 7,901,394 B2 | 3/2011 | Ireland et al. |
| 7,942,844 B2 | 5/2011 | Moberg et al. |
| 7,946,985 B2 | 5/2011 | Mastrototaro et al. |
| 7,955,305 B2 | 6/2011 | Moberg et al. |
| 7,963,954 B2 | 6/2011 | Kavazov |
| 7,977,112 B2 | 7/2011 | Burke et al. |
| 7,979,259 B2 | 7/2011 | Brown |
| 7,985,330 B2 | 7/2011 | Wang et al. |
| 8,024,201 B2 | 9/2011 | Brown |
| 8,100,852 B2 | 1/2012 | Moberg et al. |
| 8,114,268 B2 | 2/2012 | Wang et al. |
| 8,114,269 B2 | 2/2012 | Cooper et al. |
| 8,137,314 B2 | 3/2012 | Mounce et al. |
| 8,181,849 B2 | 5/2012 | Bazargan et al. |
| 8,182,462 B2 | 5/2012 | Istoc et al. |
| 8,192,395 B2 | 6/2012 | Estes et al. |
| 8,195,265 B2 | 6/2012 | Goode, Jr. et al. |
| 8,202,250 B2 | 6/2012 | Stutz, Jr. |
| 8,207,859 B2 | 6/2012 | Enegren et al. |
| 8,226,615 B2 | 7/2012 | Bikovsky |
| 8,257,259 B2 | 9/2012 | Brauker et al. |
| 8,267,921 B2 | 9/2012 | Yodfat et al. |
| 8,275,437 B2 | 9/2012 | Brauker et al. |
| 8,277,415 B2 | 10/2012 | Mounce et al. |
| 8,292,849 B2 | 10/2012 | Bobroff et al. |
| 8,298,172 B2 | 10/2012 | Nielsen et al. |
| 8,303,572 B2 | 11/2012 | Adair et al. |
| 8,305,580 B2 | 11/2012 | Aasmul |
| 8,308,679 B2 | 11/2012 | Hanson et al. |
| 8,313,433 B2 | 11/2012 | Cohen et al. |
| 8,318,443 B2 | 11/2012 | Norrild et al. |
| 8,323,250 B2 | 12/2012 | Chong et al. |
| 8,343,092 B2 | 1/2013 | Rush et al. |
| 8,352,011 B2 | 1/2013 | Van Antwerp et al. |
| 8,353,829 B2 | 1/2013 | Say et al. |
| 9,672,328 B2 | 6/2017 | Saint et al. |
| 10,130,758 B2 | 11/2018 | Diianni et al. |
| 10,765,801 B2 * | 9/2020 | McCullough ....... A61M 5/2033 |
| 10,835,727 B2 | 11/2020 | Montalvo et al. |
| 11,951,281 B2 | 4/2024 | Smith |
| 2002/0022855 A1 | 2/2002 | Bobroff et al. |
| 2002/0055711 A1 | 5/2002 | Lavi et al. |
| 2002/0123740 A1 * | 9/2002 | Flaherty ............. A61M 5/1452 604/93.01 |
| 2004/0010207 A1 * | 1/2004 | Flaherty ................ A61B 5/157 600/573 |
| 2007/0123819 A1 | 5/2007 | Mernoe et al. |
| 2008/0051718 A1 | 2/2008 | Kavazov et al. |
| 2008/0319414 A1 | 12/2008 | Yodfat et al. |
| 2010/0152674 A1 | 6/2010 | Kavazov et al. |
| 2010/0160861 A1 | 6/2010 | Causey, III et al. |
| 2010/0217105 A1 * | 8/2010 | Yodfat ............... A61B 5/14532 606/108 |
| 2015/0238705 A1 | 8/2015 | Gravesen et al. |
| 2019/0015585 A1 | 1/2019 | Smith |
| 2019/0117885 A1 | 4/2019 | Cole et al. |
| 2019/0192771 A1 * | 6/2019 | Sonderegger ....... A61M 5/3202 |
| 2019/0365987 A1 | 12/2019 | Gibson et al. |
| 2019/0365993 A1 | 12/2019 | Staub et al. |
| 2020/0001005 A1 | 1/2020 | Politis et al. |
| 2020/0108201 A1 | 4/2020 | Ben-David et al. |
| 2020/0327973 A1 | 10/2020 | Pryor et al. |
| 2022/0143306 A1 | 5/2022 | Yavorsky |
| 2022/0143307 A1 | 5/2022 | Smith |
| 2024/0252744 A1 | 8/2024 | Smith |

* cited by examiner

TORSIONAL INSERTION DEVICES

CROSS-REFERENCE TO RELATED APPLICATIONS

The present application claims the benefit of and priority to U.S. Provisional Patent Application Ser. No. 63/112,582, filed on Nov. 11, 2020, the entire content of which being hereby incorporated by reference.

TECHNICAL FIELD

This disclosure relates generally to insertion devices, and more particularly, to insulin infusion systems including torsional insertion mechanisms for cannula insertion.

BACKGROUND

A person may use insulin therapy to manage type I or type II diabetes. Insulin therapy may include use of insulin infusion systems for delivering or dispensing insulin. An insulin infusion system may include an infusion device which typically includes a small motor and drive train components configured to deliver insulin from a reservoir into the body of a person, e.g., via a percutaneous needle or a cannula placed in the subcutaneous tissue.

SUMMARY

This disclosure relates generally to insertion devices, and more particularly, to torsional insertion mechanisms.

In accordance with aspects of the present disclosure, a detachable insertion mechanism, includes a torsion spring configured to impart rotational motion to a rotatable assembly and rotate the rotatable assembly between a first position and a second position in response to the rotational motion and a piston mechanism connected to a distal portion of the torsion spring and is configured to move from a first insertion position to a second insertion position in response to the motion of the rotatable assembly, the piston mechanism includes a captive introducer needle disposed thereon, the captive introducer needle configured to pierce tissue.

In accordance with aspects of the disclosure, the piston mechanism may be configured to move from the second insertion position to the first insertion position in response to the rotatable assembly rotating from the second position to a third position respectively.

In an aspect of the present disclosure, the first insertion position is a proximal position and wherein the second insertion position is a distal position.

In another aspect of the present disclosure, the rotatable assembly may include a first surface defining a recess and a boss configured to impart a linear motion to the piston mechanism. The piston mechanism includes a mid-section including an interior surface defining a slot that is configured to receive the boss and impart linear motion to the piston mechanism.

In yet another aspect of the present disclosure, the detachable insertion mechanism may further include a cannula carrier including a cannula configured to be inserted into subcutaneous tissue.

In a further aspect of the present disclosure, the cannula may be moveable between a first cannula position and second cannula position in response to the rotation of the rotatable assembly.

In yet a further aspect of the present disclosure, the detachable insertion mechanism may further include a latch member configured to selectively attach the detachable insertion mechanism to a disposable patch pump assembly.

In an aspect of the present disclosure, the latch assembly may include two latch arms including fingers on a distal portion of each of the latch arms. The fingers may be configured to selectively hold and release a disposable patch pump assembly.

In accordance with aspects of the disclosure, an infusion pump system includes a detachable insertion mechanism and a disposable patch pump assembly configured to dispense a medicament. The detachable insertion mechanism includes a torsion spring configured to impart rotational motion to a rotatable assembly and rotate the rotatable assembly between a first position and a second position in response to the rotational motion and a piston mechanism connected to a distal portion of the torsion spring and configured to move from a first insertion position to a second insertion position in response to the motion of the rotatable assembly. The piston mechanism includes a captive introducer needle disposed thereon, the captive introducer needle configured to pierce tissue.

In yet another aspect of the present disclosure, the piston mechanism may be configured to move from the second insertion position to the first insertion position in response to the rotatable assembly rotating from the second position to a third position, respectively.

In a further aspect of the present disclosure, the disposable patch pump assembly may include a housing including a through bore configured for insertion of the captive introducer needle into subcutaneous tissue and a medical reservoir configured for holding the medicament.

In yet a further aspect of the present disclosure, the detachable insertion mechanism may further include a cannula carrier including a cannula configured to be inserted into subcutaneous tissue.

In yet a further aspect of the present disclosure, the cannula may be moveable between a first cannula position and second cannula position in response to the rotation of the rotatable assembly.

In an aspect of the present disclosure, the medical reservoir may include a reservoir outlet. The medical reservoir is configured to prevent medicament from flowing through the reservoir outlet when the cannula is in the first cannula position and to permit medicament flow through the reservoir outlet in response to the cannula being moved from the first cannula position.

In another aspect of the present disclosure, the detachable insertion mechanism may further include a latch member configured to selectively attach the detachable insertion mechanism to the disposable patch pump assembly.

In yet another aspect of the present disclosure, the torsion spring may be configured to rotate the rotatable assembly between a first spring position and a second spring position.

In a further aspect of the present disclosure, the piston mechanism may be configured to move from a first insertion position to a second insertion position in response to the rotation of the rotatable assembly.

In yet a further aspect of the present disclosure, the rotatable assembly may include a side surface defining a recess. The detachable insertion mechanism may further include a stop member configured to selectively prevent rotation of the rotatable assembly. The rotatable assembly may be configured to receive the stop member in the recess.

In another aspect of the present disclosure, the first insertion position may be a proximal position and the second insertion position may be a distal position.

In an aspect of the present disclosure, a method for operating an ambulatory infusion system includes: inserting a cannula carrier of a detachable insertion mechanism into a disposable patch pump assembly in response to rotational motion of a rotatable assembly of the detachable insertion mechanism, wherein the rotatable assembly rotates in response to motion imparted by a torsional spring, forming an environmental and a fluid path seal in response to the cannula carrier being inserted into the patch pump assembly, inserting the cannula into subcutaneous tissue in response to the rotation motion of the rotatable assembly, and retracting an introducer needle in response to the rotation motion of the rotatable assembly.

BRIEF DESCRIPTION OF THE DRAWINGS

The above and other aspects and features of the disclosure will become more apparent in view of the following detailed description when taken in conjunction with the accompanying drawings wherein like reference numerals identify similar or identical elements.

DETAILED DESCRIPTION

This disclosure relates generally to insertion devices, and more particularly, to torsional insertion mechanisms for insulin infusion systems.

Although the disclosure may be described primarily with respect to cannula insertion for insulin infusion systems, the scope of the disclosure is equally applicable other devices which include cannula, needles, or the like, that are at least partially implantable.

As used herein, "exemplary" does not necessarily mean "preferred" and may simply refer to an example unless the context clearly indicates otherwise.

Figure 1:
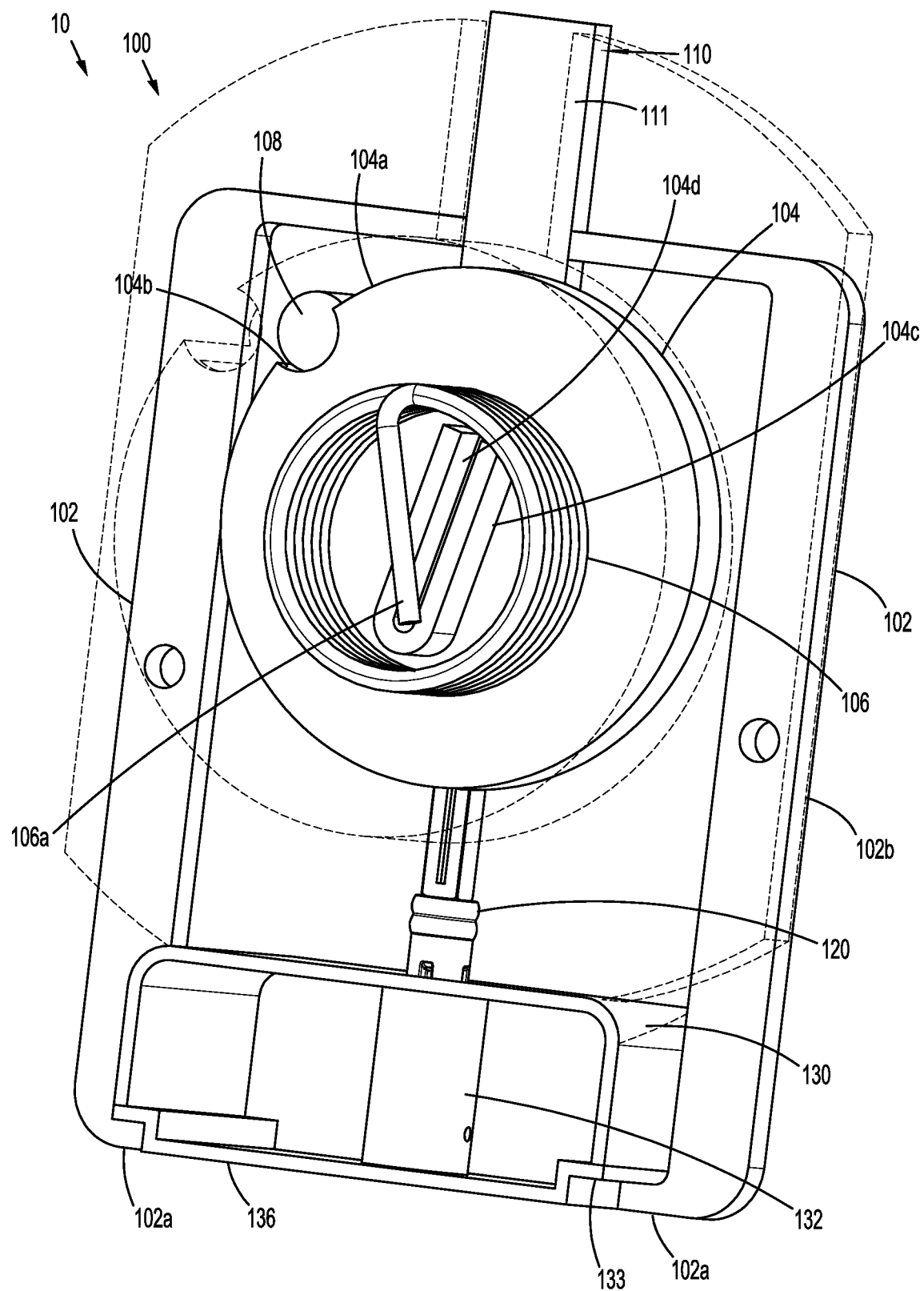
FIG. 1 is an illustration of an exemplary torsional insertion mechanism showing a frame assembly of the torsional insertion mechanism removed, in accordance with aspects of the disclosure.
Figure 2:
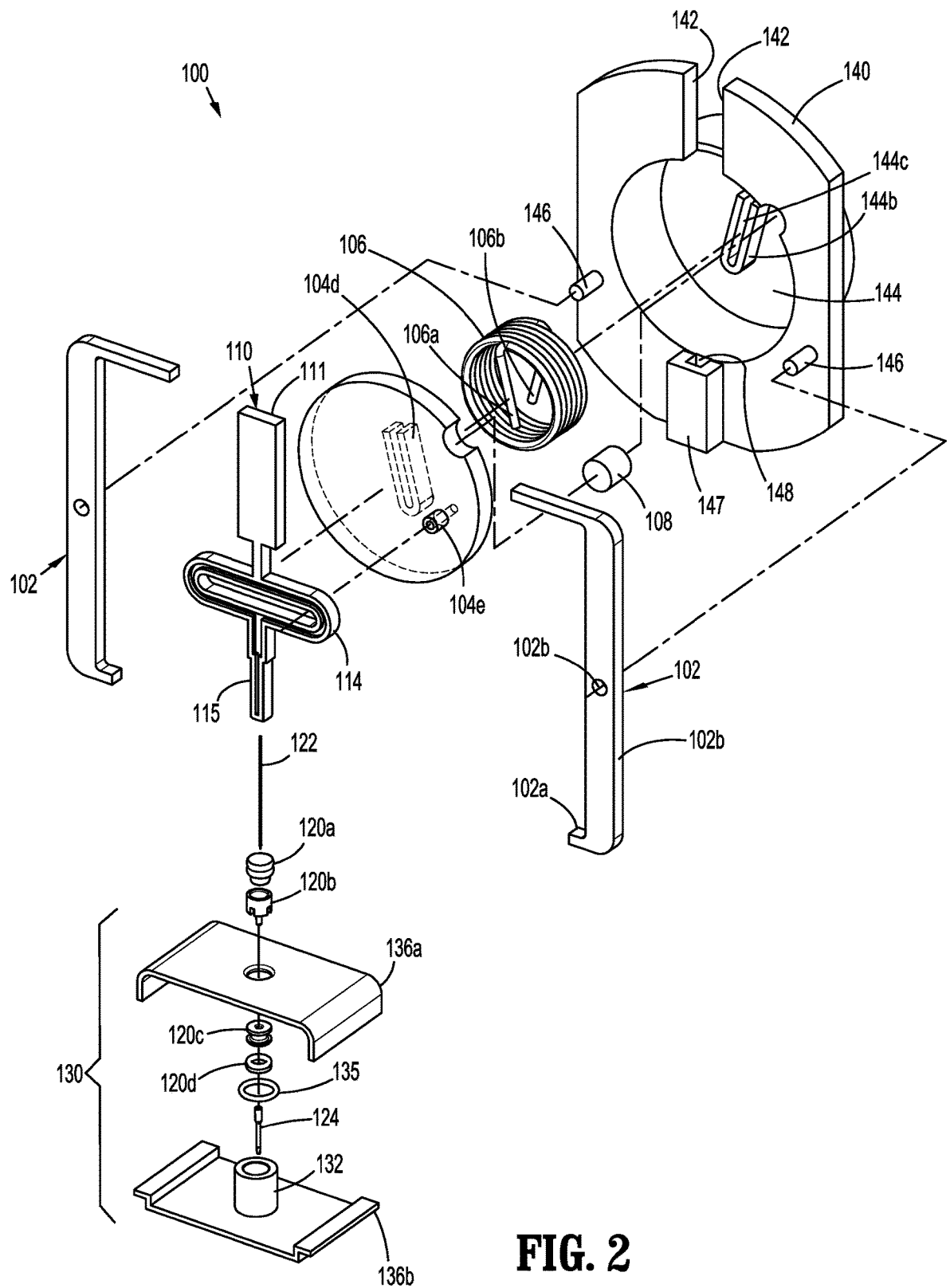
FIG. 2 is an exploded perspective view of the torsional insertion mechanism of FIG. 1 showing a housing of the torsional insertion mechanism removed, in accordance with aspects of the disclosure.
Figure 3:
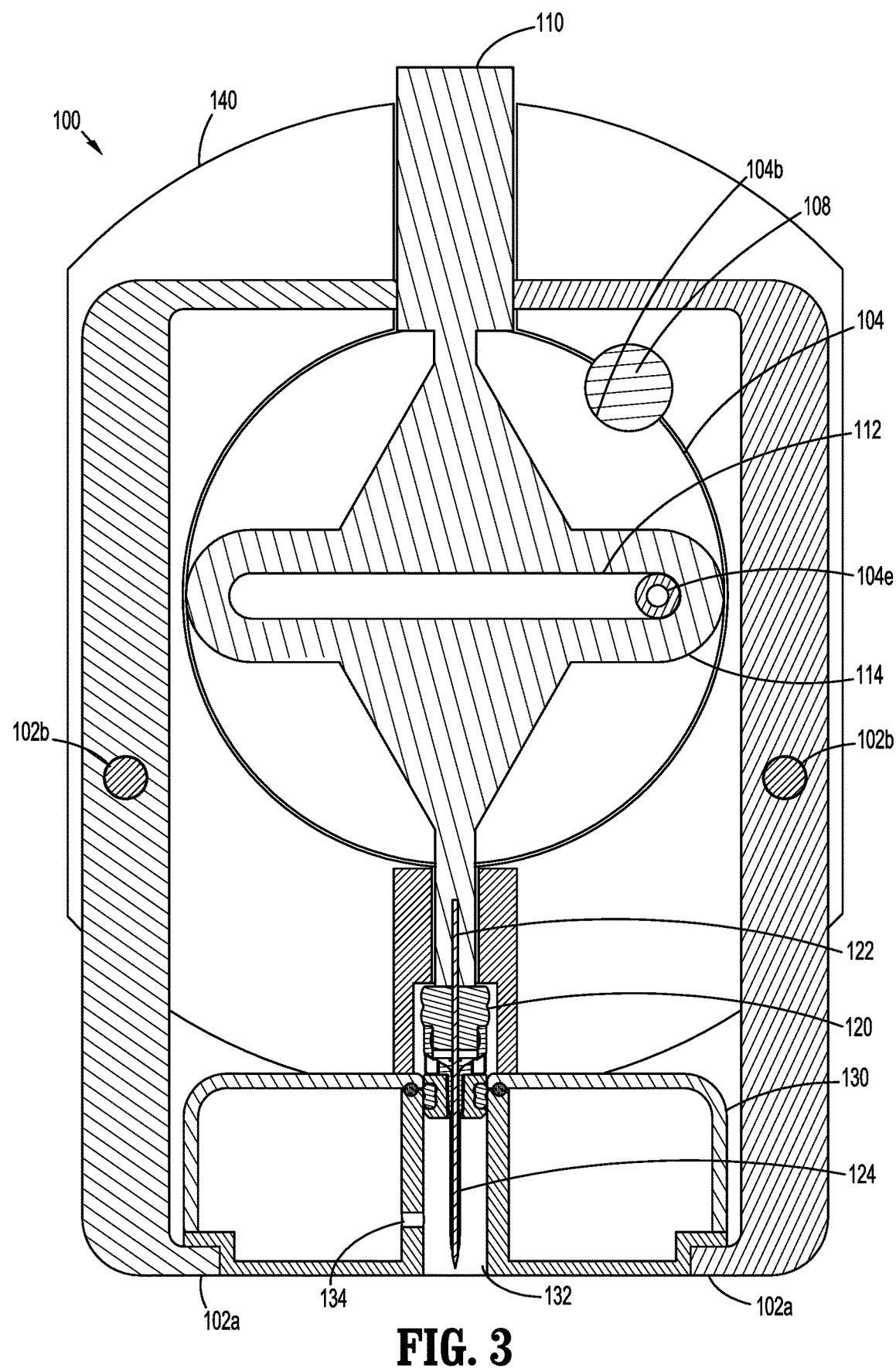
FIG. 3 is a cross-sectional view of the torsional insertion mechanism of FIG. 1 illustrating components of the torsional insertion mechanism and showing a piston assembly of the insertion assembly in a first position, in accordance with aspects of the disclosure.

Referring to FIGS. 1-3, an exemplary detachable torsional insertion mechanism 100, of an exemplary infusion pump system 10, configured for cannula insertion is shown. The infusion pump system 10 generally includes a detachable torsional insertion mechanism 100 and a disposable patch pump assembly 130. The disposable patch pump assembly 130 includes a medical reservoir 136 which if formed from an upper housing 136a and a lower housing 136b (FIG. 2). The medical reservoir 136 may include a reservoir outlet 134.

The torsional insertion mechanism 100 generally includes a torsion spring 106, a rotatable assembly 104, a frame assembly 140, and a piston mechanism 110 configured to pierce tissue using a captive introducer needle 122 and insert a cannula 124 (FIG. 4) into subcutaneous tissue.

The torsion spring 106 is fixedly attached to rotatable assembly 104. The torsion spring 106 is configured to rotate the rotatable assembly 104 between a first position and a spring position. The torsion spring 106 includes a proximal portion 106a and a distal portion 106b. The proximal portion 106a of the torsion spring 106 may be retained in a recess 104d at the first surface 104c of the rotatable assembly 104. The distal portion 106b of the torsion spring 106 may be retained in a recess 144d at the top surface 144c of the frame assembly 140.

The torsion spring 106 is configured to store potential energy in a first position and then impart rotational motion to the rotatable assembly 104. The torsion spring 106 may be pre-loaded (e.g., placed under tension) prior to installation in the infusion pump system 10 such that the torsion spring 106 stores potential energy for later use.

In aspects, the torsional insertion mechanism 100 may further include a stop member 108 configured to selectively prevent rotation of the rotatable assembly 104. The stop member 108 may be configured to move from a first stop position to prevent rotation of the rotatable assembly 104 by engaging the stop recess 133 of the rotatable assembly 104 to a second stop position to enable rotation of the rotatable assembly 104 by disengaging the stop recess 133 of the rotatable assembly 104. The stop member 108 may be used to prevent rotation of the rotatable assembly 104 until cannula 124 insertion is desired. It is contemplated that any of a variety of triggering techniques may be used to move the stop member 108 out of the way and allow the torsion spring 106 to impart rotational motion to the rotatable assembly 104. The stop member 108 is shown as cylindrical in shape, however, it is contemplated that the stop member 108 may be any suitable shape.

The rotatable assembly 104 is configured to rotate in response to the torsional energy of the torsional spring 106, and impart linear motion to the piston mechanism 110 in response to the rotation of the rotatable assembly 104. The rotatable assembly 104 includes a recess 104d on a first surface 104c. The recess 104d is configured for retaining the proximal portion 106a of the torsional spring 106. The rotatable assembly 104 may include a stop recess 104b that is configured to receive a stop member 108 (FIG. 1) for enabling or disabling rotation of the rotatable assembly 104.

The frame assembly 140, generally includes a latch assembly 102, a frame boss 146 configured for enabling the latch assembly 102 to pivot about an axis, a recess 144c configured for receiving the torsional spring 106 and the rotatable assembly 104, the recess 144c configured for retaining the distal portion 106b of the torsion spring 106, and a guide boss 147 configured to guide the motion of a distal portion 115 of the piston mechanism 110.

The latch assembly 102 generally includes one or more arms 102b and a finger 102a at a distal portion of each of the arms 102b. Each arm 102b includes a through bore 102c configured to receive a frame boss 146 and selectively pivot about that frame boss 146. Each finger 102a is configured to retain a disposable patch pump assembly 130 of the exemplary infusion pump system 10. The latch assembly 102 may be actuated manually or by a motor (not shown).

The guide boss 147 includes a through bore 148 configured to guide the linear motion of the distal portion 115 of the piston mechanism 110.

The piston mechanism 110 is configured to pierce tissue using a captive introducer needle 122 and insert a cannula 124 (FIG. 4) into subcutaneous tissue in response to the rotational motion of the rotatable assembly 104. The piston mechanism 110 generally includes a proximal portion 111, a center portion 114, and a distal portion 115. The proximal portion 111 is received by the recess 142 of the frame assembly 140. The proximal portion 111 is configured to be guided by the recess 142 during linear motion of the proximal portion 111. The center portion 114 of the piston mechanism 110 includes a slot 112 configured for receiving boss 104e of the rotatable assembly 104. As the rotatable assembly 104 rotates, a linear motion is imparted on the piston mechanism 110 in response to the motion of the boss 104e in the slot 112 of piston mechanism 110.

Figure 4:
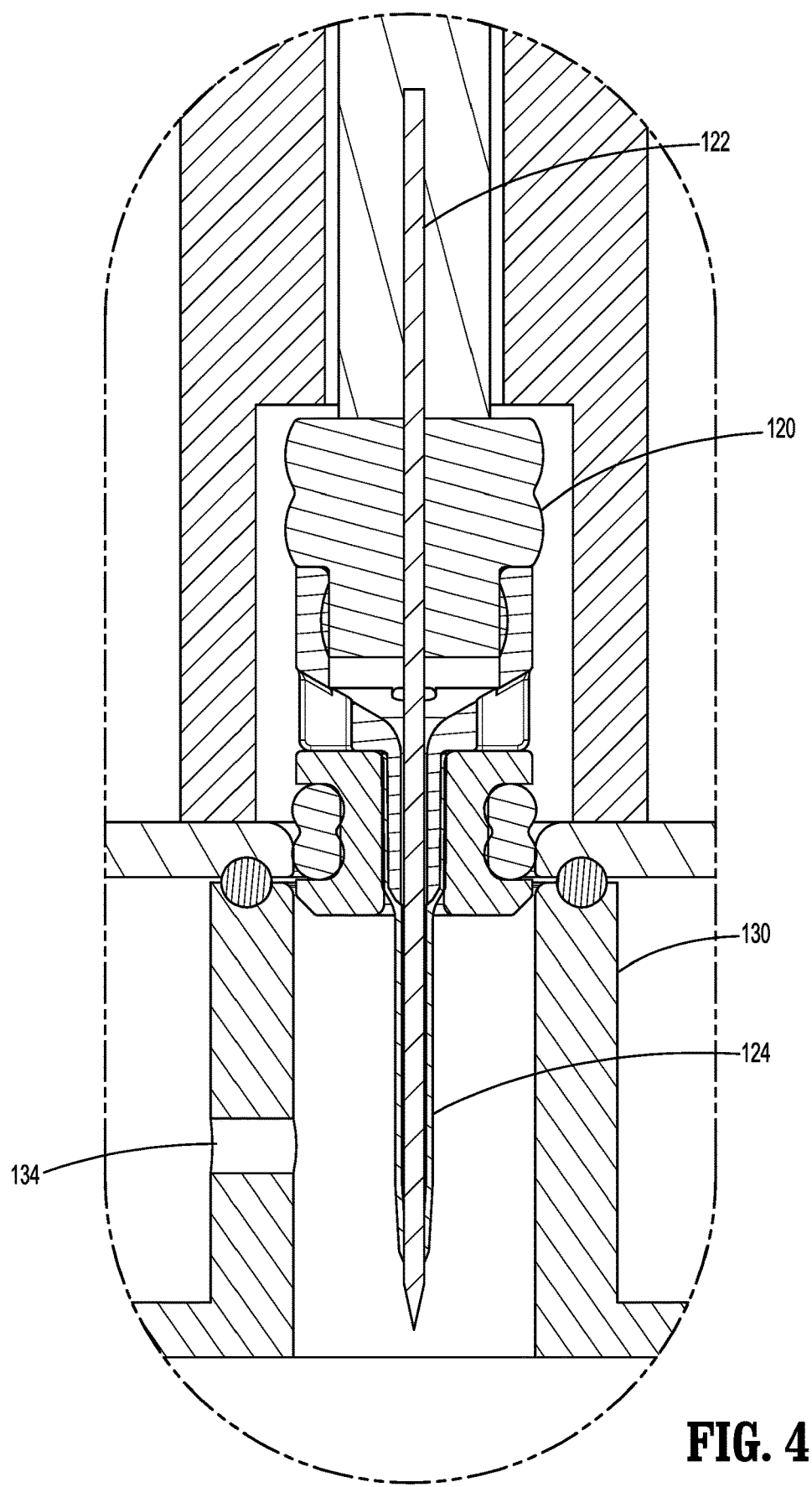
FIG. 4 is a cross-sectional view of the torsional insertion mechanism of FIG. 1 illustrating a cannula carrier of the torsional insertion mechanism, in accordance with aspects of the disclosure.
Figure 5:
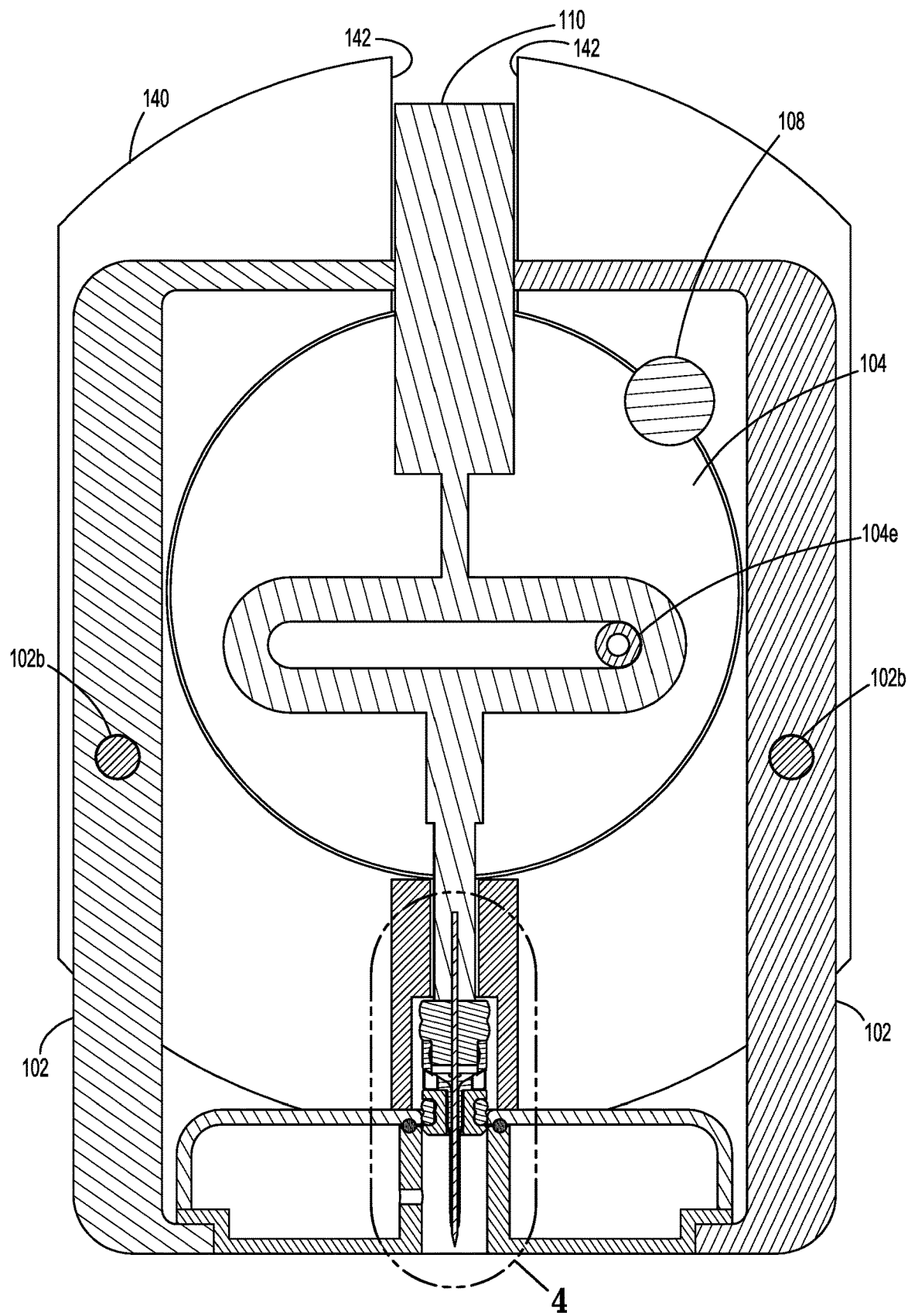
FIG. 5 is a cross-sectional view of the torsional insertion mechanism of FIG. 1 illustrating components of the torsional insertion mechanism and showing the piston assembly of the insertion assembly in a first position, in accordance with aspects of the disclosure.
Figure 7B:
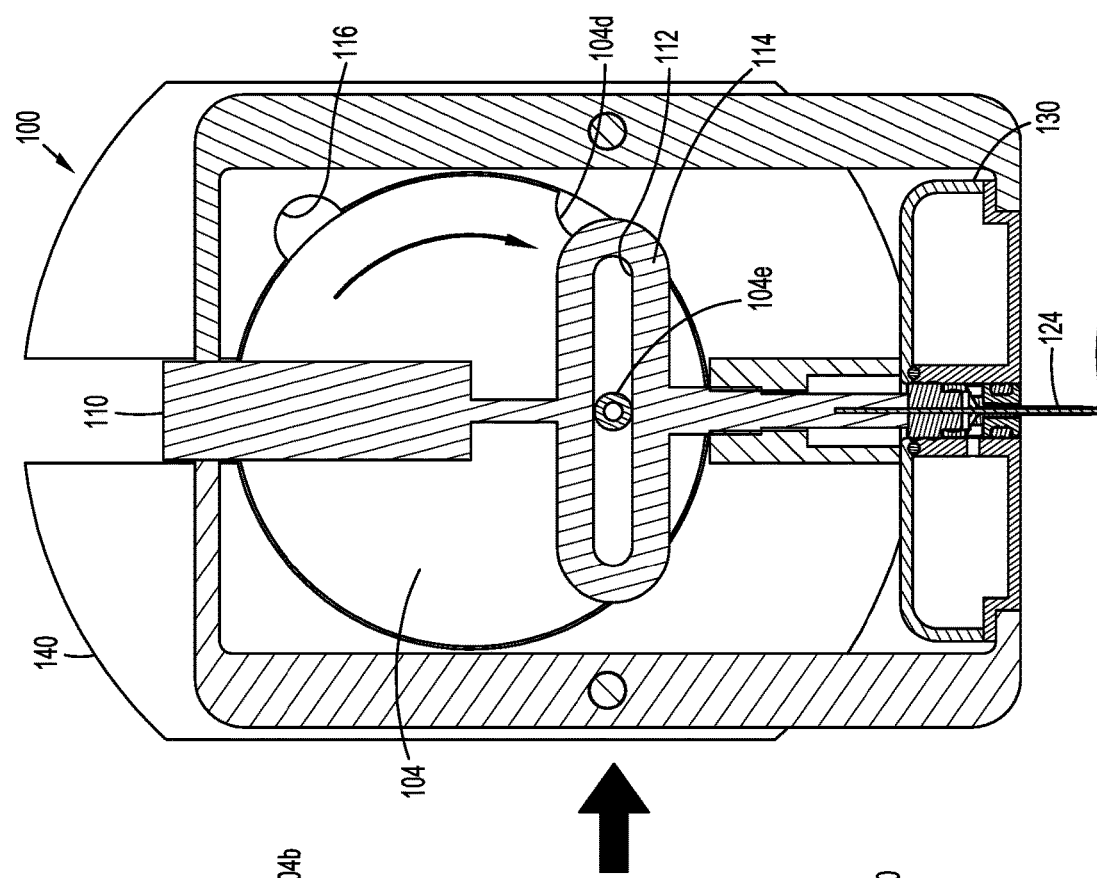
FIGS. 7A and 7B are progressive side cutaway views of the torsional insertion mechanism of FIG. 1 showing a rotatable assembly rotating from a first position to a second position, in accordance with aspects of the disclosure.
Figure 7A:
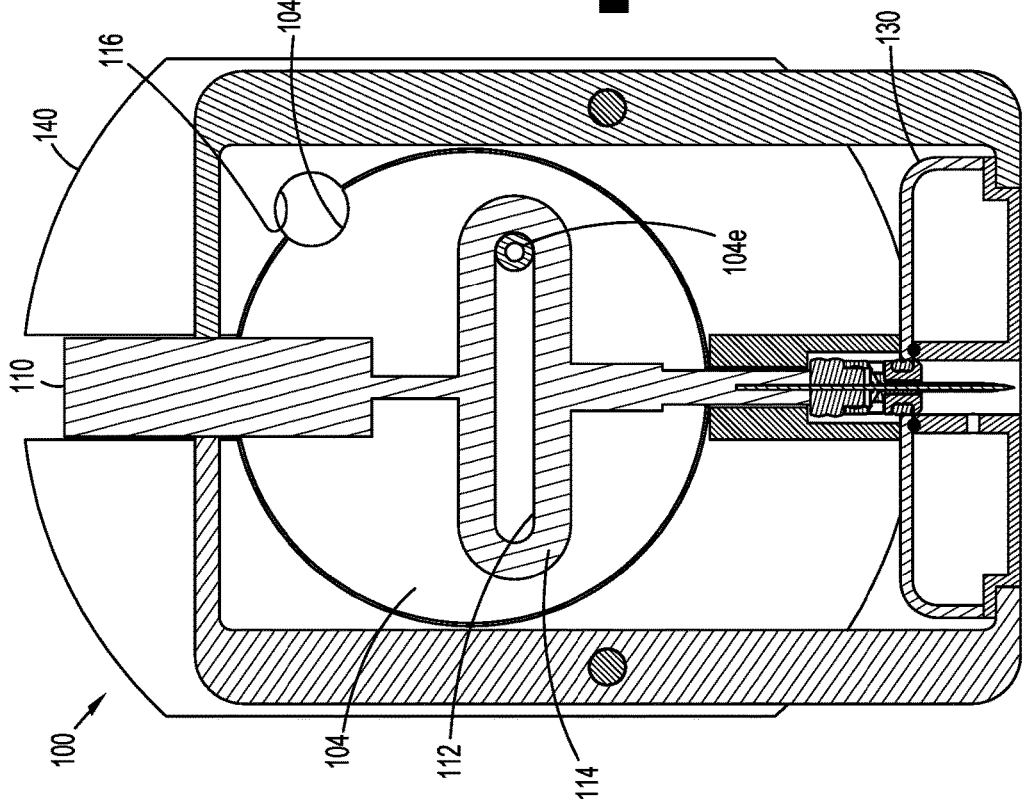

Referring to FIG. 4, a cross-sectional view of the distal portion 115 of the piston mechanism 110 is shown. The distal portion 115 of the piston mechanism 110 is configured to move from a first insertion position (FIG. 7A) to a second insertion position (FIG. 7B) in response to the rotation of the rotatable assembly 104. The distal portion 115 of the piston mechanism 110 generally includes the captive introducer needle 122, a needle guide 120a, and a cannula carrier 120. The first insertion position of the distal portion 115 of the piston mechanism 110 may be a proximal position, and the second insertion position of distal portion 115 may be a distal position. The distal portion 115 of the piston mechanism 110 may further move from the second insertion position (FIG. 8A) to a third insertion position (FIG. 8B) in response to further rotation of the rotatable assembly 104.

The captive introducer needle 122 projects outwardly and axially from the bottom of the distal portion 115 of the piston mechanism 110 and is configured to pierce the skin of a user and to enable the cannula 124 to penetrate or extend through the skin of the user.

The needle guide 120a of distal portion 115 of the piston mechanism 110 generally includes one or more radial seals 120c, 120d around a perimeter of the needle guide 120a and a captive elastomer septum 120b that seals around the introducer needle 122. In the figures, the one or more radial seals 120c, 120d are depicted as redundant dual lobed seals. However, it should be appreciated that one or more single lobed seals can be used instead. This includes the benefit of enabling the reduction in height and/or size of the distal portion 115 of the piston mechanism 110.

The cannula carrier 120 of the distal portion 115 generally includes a cannula 124 configured for fluid communication with a medical reservoir of a disposable patch pump assembly 130, the medical reservoir being configured for holding a fluid medicament (e.g., insulin), one or more radial seals 120c, 120d around the perimeter of the cannula carrier 120 configured for sealing the cannula carrier 120, and a through bore 132 configured for permitting the cannula and captive introducer needle 122 to pass through the through bore 132 and into tissue. In aspects, the cannula carrier 120 may be secured to the needle guide 120a through a press-fit engagement with the cannula 124, via glue, snaps, welding, and/or other suitable method of attachment. A fluid flow path 134 (FIG. 3) may be defined which passes through the needle guide 120a and to the cannula 124 in the cannula carrier 120. The cannula 124 may be captured in a radial gap defined between the cannula carrier 120 of the needle guide 120a.

The distal portion 115 of the piston mechanism 110 is configured to move up and/or down or translate axially relative to a longitudinal axis defined by the cannula 124 or cannula carrier 120. In operation, during insertion of the cannula 124 into the tissue or through the skin of the user, the distal portion 115 of the piston mechanism 110 may push downward (e.g., in a direction toward the skin of the patient) or act on the needle guide 120a, which may push down or act on the cannula carrier 120. In operation, the distal portion 115 of the piston mechanism 110 may also pull up (e.g., in a direction away from the skin of the user), to a third introducer position, to at least partially retract the captive introducer needle 122 through the needle guide 120a.

Figure 6A:
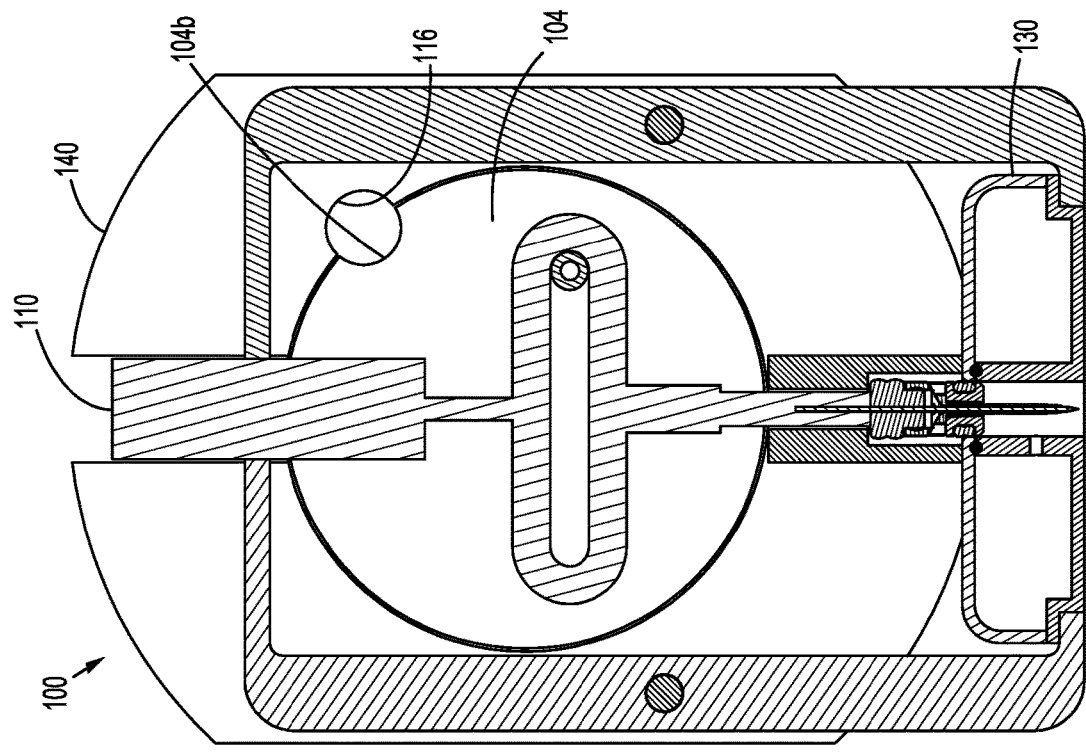
FIGS. 6A and 6B are progressive side cutaway views of the torsional insertion mechanism of FIG. 1 showing a stop member being removed, in accordance with aspects of the disclosure.
Figure 6B:
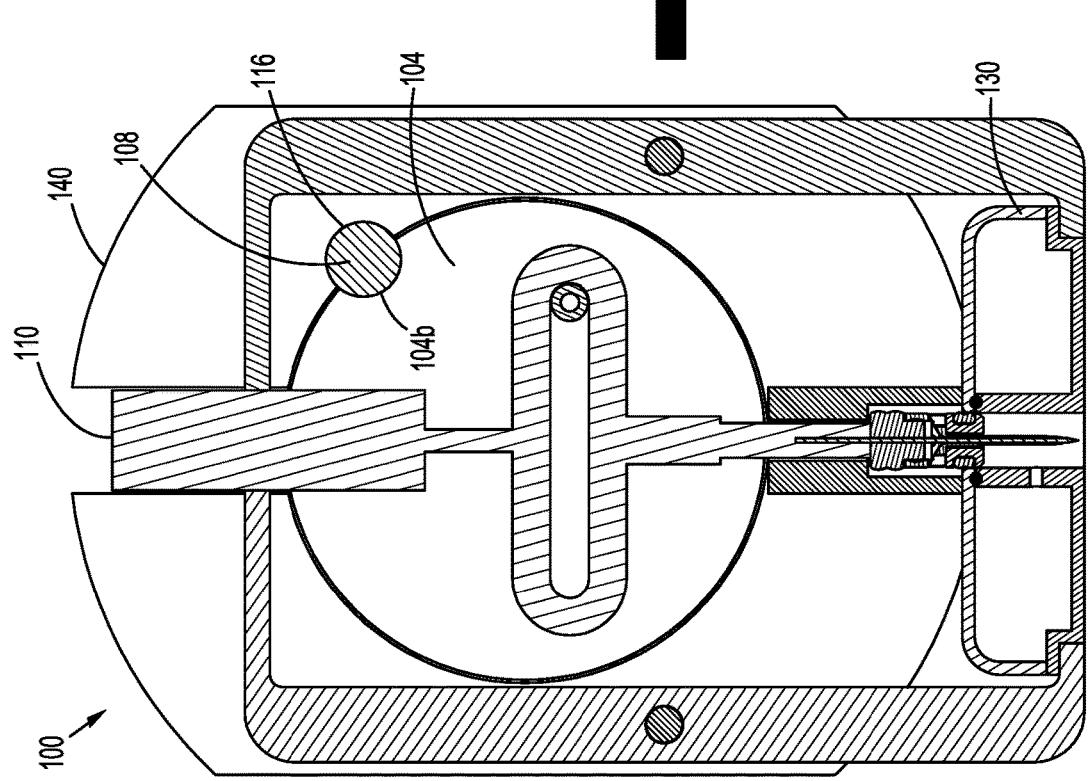

FIGS. 6A-8B show progressive views of the operation of the torsional insertion mechanism 100 of FIG. 1. Initially, the stop member 108 is disengaged from the rotatable assembly 104 of the torsional insertion mechanism 100 (FIGS. 6A and 6B). For example, a motor (not shown) of an infusion pump system 10 (FIG. 1) may be used to remove the stop member 108. In another example, a push/pull button (not shown) may be used to disengage the stop member 108. Once the stop member 108 is removed, the rotatable assembly 104 is no longer constrained against rotation and begins to rotate in response to the stored potential energy in the torsional spring 106 being converted to kinetic energy. The pre-loaded (e.g., pre-tensioned and/or torsioned or wound) torsion spring 106 starts to impart torque and/or rotation on the rotatable assembly 104 (FIG. 11). Next, the rotatable assembly 104 rotates in response to torque forces being imparted thereto by the torsional spring 106 (FIGS. 7A and 7B), and moved from a first position to a second position.

As the rotatable assembly 104 rotates, the distal portion 115 of the piston mechanism 110 is moved in a vertical motion (e.g., downward in an insertion direction toward the skin of the patent) in response to the rotation of the rotatable assembly 104.

The center portion 114 of the piston mechanism 110 includes a slot 112 configured for receiving boss 104e of the rotatable assembly 104. As the rotatable assembly 104 rotates, a linear motion is imparted on the piston mechanism 110 in response to the motion of the boss 104e in the slot 112.

The boss 104e of the rotatable assembly 104 moves along slot 112 of the center portion 114 of the piston mechanism 110 and imparts linear motion to the piston mechanism 110, causing the distal portion 115 of the piston mechanism 110 to move in the downward direction from a first insertion position (FIG. 7A) to a second insertion position (FIG. 7B), exposing the captive introducer needle 122 and cannula 124 from the bottom of the disposable patch pump assembly 130.

Figure 8A:
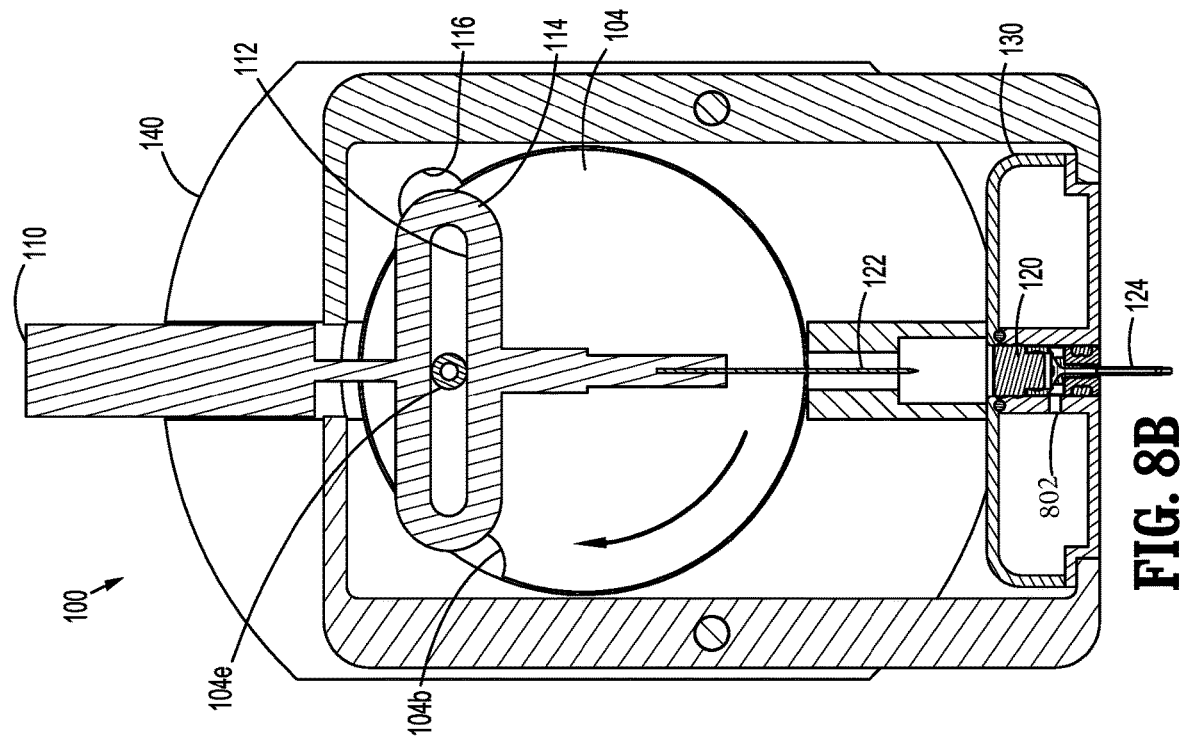
FIGS. 8A and 8B are progressive side cutaway views of the torsional insertion mechanism of FIG. 1 showing a rotatable assembly rotating from the second position to a third position, in accordance with aspects of the disclosure.
Figure 8B:
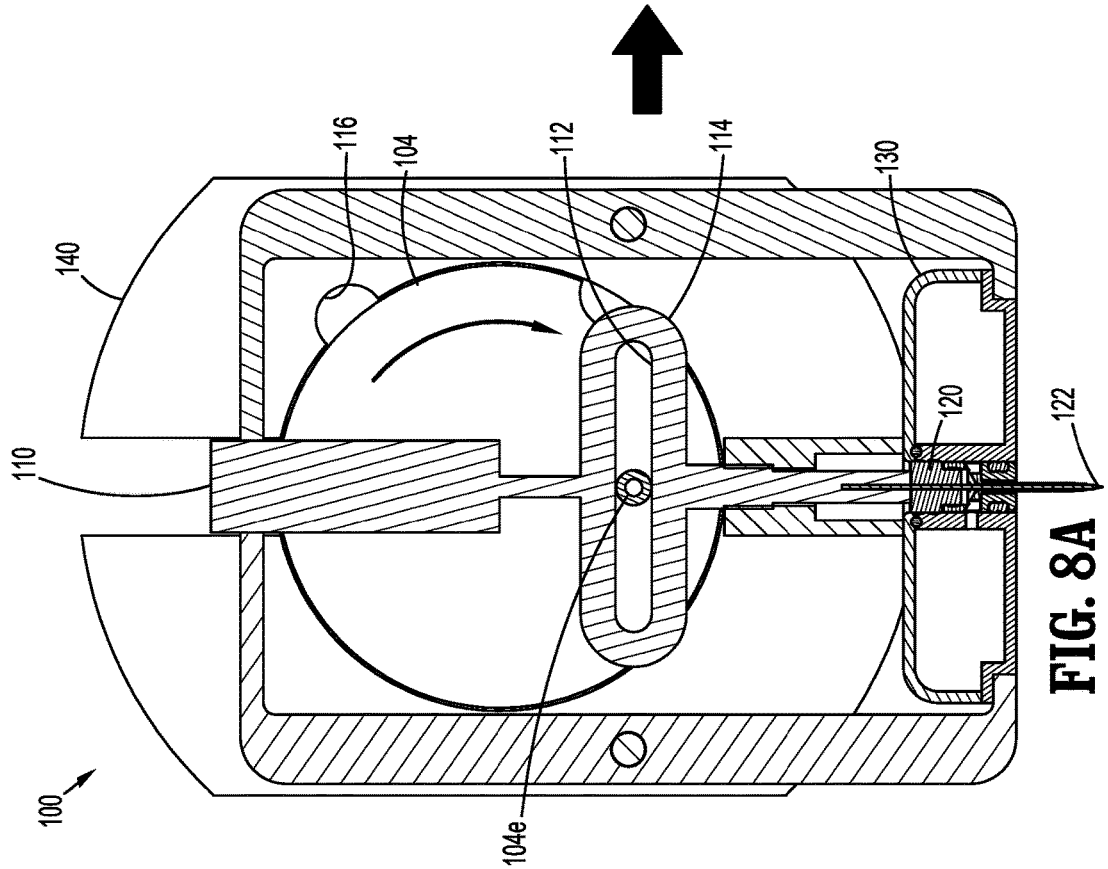

Referring to FIG. 8B, a fluid delivery path 802 of the torsional insertion mechanism 100 is shown. In the second insertion position, a fluid delivery path 134 is formed. The medical reservoir 136 is configured to prevent medicament from flowing through the reservoir outlet 134 when the cannula 124 is in the first cannula position and to permit medicament flow through the reservoir outlet 134 in response to the cannula 124 being moved from the first cannula position.

Referring to FIGS. 8A and 8B, as the rotatable assembly 104 rotates from a second position (FIG. 8A) to a third position (FIG. 8B) in response to the rotational motion imparted by the torsion spring 106, the captive introducer needle 122 retracts back into the distal portion 115 of the piston mechanism 110. Since the introducer needle 122 is retracted, fluid delivery of the medicament (e.g., insulin) is enabled (FIG. 8B).

Figure 9C:
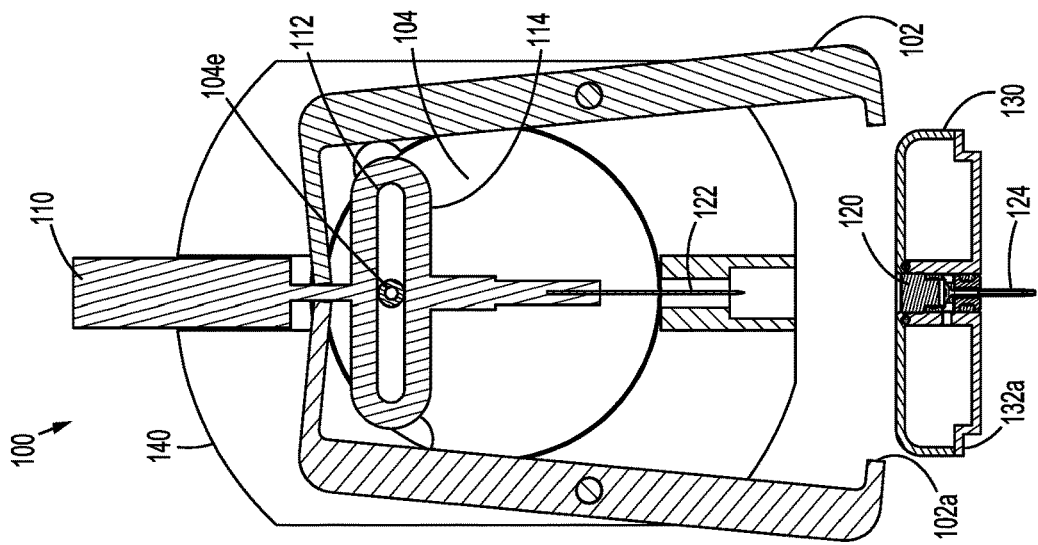
FIGS. 9A-9C are progressive side cutaway views of the torsional insertion mechanism of FIG. 1 showing a latch assembly moving from a first latch position to a third latch position, in accordance with aspects of the disclosure.
Figure 9B:
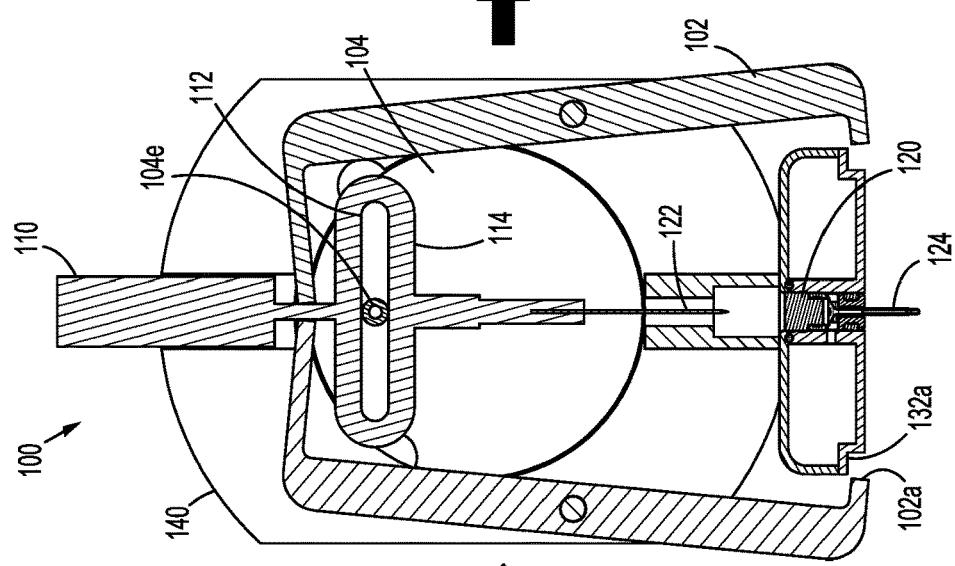
Figure 9A:
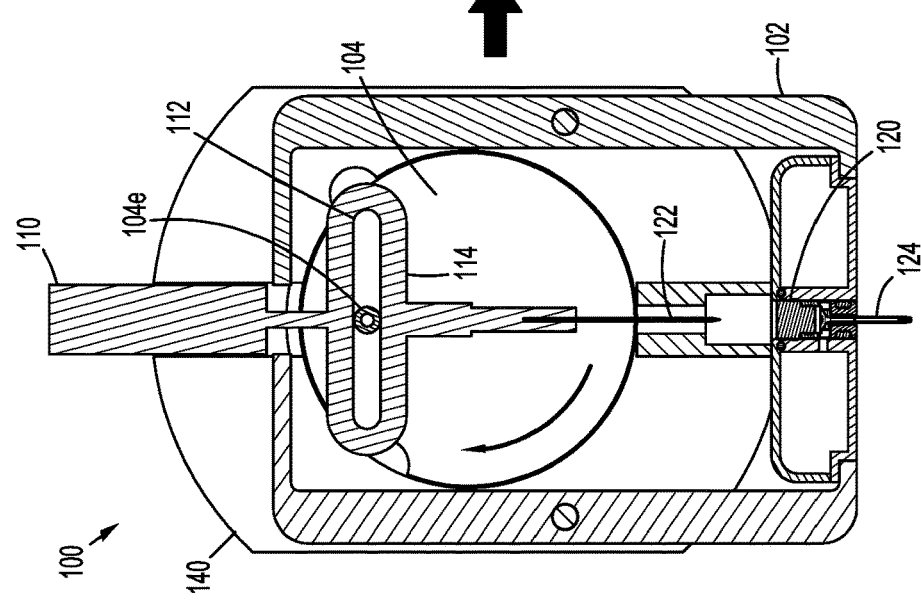

Referring to FIGS. 9A-C progressive views of the actuation of the latch assembly 102 of the torsional insertion mechanism 100 of FIG. 1 is shown. Initially, the latch assembly is in a first position, where it retains the disposable patch pump assembly 130 of the exemplary infusion pump system 10 (FIG. 9A). Next, the arms 102b of the latch assembly 102 begin to pivot about frame boss 146 (FIG. 2) into a second position (FIG. 9B), enabling each finger 102a which is at the distal portion of each of the arms 102b to release the disposable patch pump assembly 130. Finally, the disposable patch pump assembly 130 is released.

The phrases "in an embodiment," "in embodiments," "in various embodiments," "in some embodiments," or "in other embodiments" may each refer to one or more of the same or different embodiments in accordance with the disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the disclosure. To the extent consistent, any or all of the aspects detailed herein may be used in conjunction with any or all of the other aspects detailed herein. Various alternatives and modifications can be devised by those skilled in the art without departing from the disclosure. Accordingly, the disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure. Therefore, the above description should not be construed as limiting, but merely as exemplifications of particular embodiments. Those skilled in the art will envision other modifications within the scope and spirit of the claims appended hereto.

What is claimed is:

1. A detachable insertion mechanism, comprising:
   a torsion spring configured to impart rotational motion to a rotatable assembly and rotate the rotatable assembly between a first position and a second position in response to the rotational motion;
   a piston mechanism connected to a distal portion of the torsion spring and configured to move from a first insertion position to a second insertion position in response to the motion of the rotatable assembly, the piston mechanism includes a captive introducer needle disposed thereon, the captive introducer needle configured to pierce tissue; and
   a stop member configured to selectively prevent rotation of the rotatable assembly, wherein the rotatable assembly includes a recess, and the rotatable assembly is configured to receive the strop member in the recess.

2. The detachable insertion mechanism according to claim 1, wherein the piston mechanism is configured to move from the second insertion position to the first insertion position in response to the rotatable assembly rotating from the second position to a third position respectively.

3. The detachable insertion mechanism according to claim 1, wherein the first insertion position is a proximal position and wherein the second insertion position is a distal position.

4. The detachable insertion mechanism according to claim 1, wherein the rotatable assembly includes:
   a boss configured to impart a linear motion to the piston mechanism,
   wherein the piston mechanism includes a mid-section including an interior surface defining a slot, the slot configured to receive the boss and impart the linear motion to the piston mechanism.

5. The detachable insertion mechanism according to claim 4, wherein the piston mechanism includes a cannula carrier including a cannula configured to be inserted into subcutaneous tissue.

6. The detachable insertion mechanism according to claim 5, wherein the cannula is moveable between a first cannula position and a second cannula position in response to the rotation of the rotatable assembly.

7. The detachable insertion mechanism according to claim 1, further comprising a latch assembly configured to selectively attach the detachable insertion mechanism to a disposable patch pump assembly.

8. The detachable insertion mechanism according to claim 7, wherein the latch assembly includes two latch arms including fingers on a distal portion of each of the latch arms, wherein the fingers are configured to selectively hold and release a disposable patch pump assembly.

9. An infusion pump system, comprising:
   a detachable insertion mechanism including:
      a torsion spring configured to impart rotational motion to a rotatable assembly and rotate the rotatable assembly between a first position and a second position in response to the rotational motion;
      a piston mechanism connected to a distal portion of the torsion spring and configured to move from a first insertion position to a second insertion position in response to the motion of the rotatable assembly, the piston mechanism includes a captive introducer needle disposed thereon, the captive introducer needle configured to pierce tissue; and
      a stop member configured to selectively prevent rotation of the rotatable assembly,
      wherein the rotatable assembly includes a recess, and the rotatable assembly is configured to receive the stop member in the recess; and
   a disposable patch pump assembly configured to dispense a medicament.

10. The infusion pump system according to claim 9, wherein the piston mechanism is configured to move from the second insertion position to the first insertion position in response to the rotatable assembly rotating from the second position to a third position.

11. The infusion pump system according to claim 9, wherein the disposable patch pump assembly includes:
   a housing including a through bore configured for insertion of the captive introducer needle into subcutaneous tissue; and
   a medical reservoir configured for holding the medicament.

12. The infusion pump system according to claim 11, wherein the detachable insertion mechanism further includes a cannula carrier including a cannula configured to be inserted into subcutaneous tissue.

13. The infusion pump system according to claim 12, wherein the cannula is moveable between a first cannula position and a second cannula position in response to the rotation of the rotatable assembly.

14. The infusion pump system according to claim 13, wherein the medical reservoir includes a reservoir outlet; and wherein the medical reservoir is configured to prevent medicament from flowing through the reservoir outlet when the cannula is in the first cannula position and to permit medicament to flow through the reservoir outlet in response to the cannula being moved from the first cannula position.

15. The infusion pump system according to claim 9, wherein the detachable insertion mechanism further includes at least one latch member configured to selectively attach the detachable insertion mechanism to the disposable patch pump assembly.

16. The infusion pump system according to claim 9, wherein the torsion spring is configured to rotate the rotatable assembly between a first spring position and a second spring position.

17. The infusion pump system according to claim 16, wherein the piston mechanism is configured to move from a first insertion position to a second insertion position in response to the rotation of the rotatable assembly.

18. The infusion pump system according to claim 9, wherein the first insertion position is a proximal position and wherein the second insertion position is a distal position.

19. An infusion pump system, comprising:
a detachable insertion mechanism including:
a torsion spring configured to impart rotational motion to a rotatable assembly and rotate the rotatable assembly between a first position and a second position in response to the rotational motion; and
a piston mechanism connected to a distal portion of the torsion spring and configured to move from a first insertion position to a second insertion position in response to the motion of the rotatable assembly, the piston mechanism includes a captive introducer needle disposed thereon, the captive introducer needle configured to pierce tissue,
a cannula movable between a first cannula position and a second cannula position, and
a disposable patch pump assembly configured to dispense a medicament and comprising a medical reservoir for holding the medicament, the medical reservoir including a reservoir outlet,
wherein the disposable patch pump assembly is configured to prevent medicament from flowing through the reservoir outlet when the cannula is in the first cannula position and to permit medicament to flow through the reservoir outlet in response to the cannula being moved from the first cannula position,
wherein the rotatable assembly includes a boss configured to move along a slot of the piston mechanism to impart a linear motion to the piston mechanism.

* * * * *